United States Patent Office 3,512,439
Patented May 19, 1970

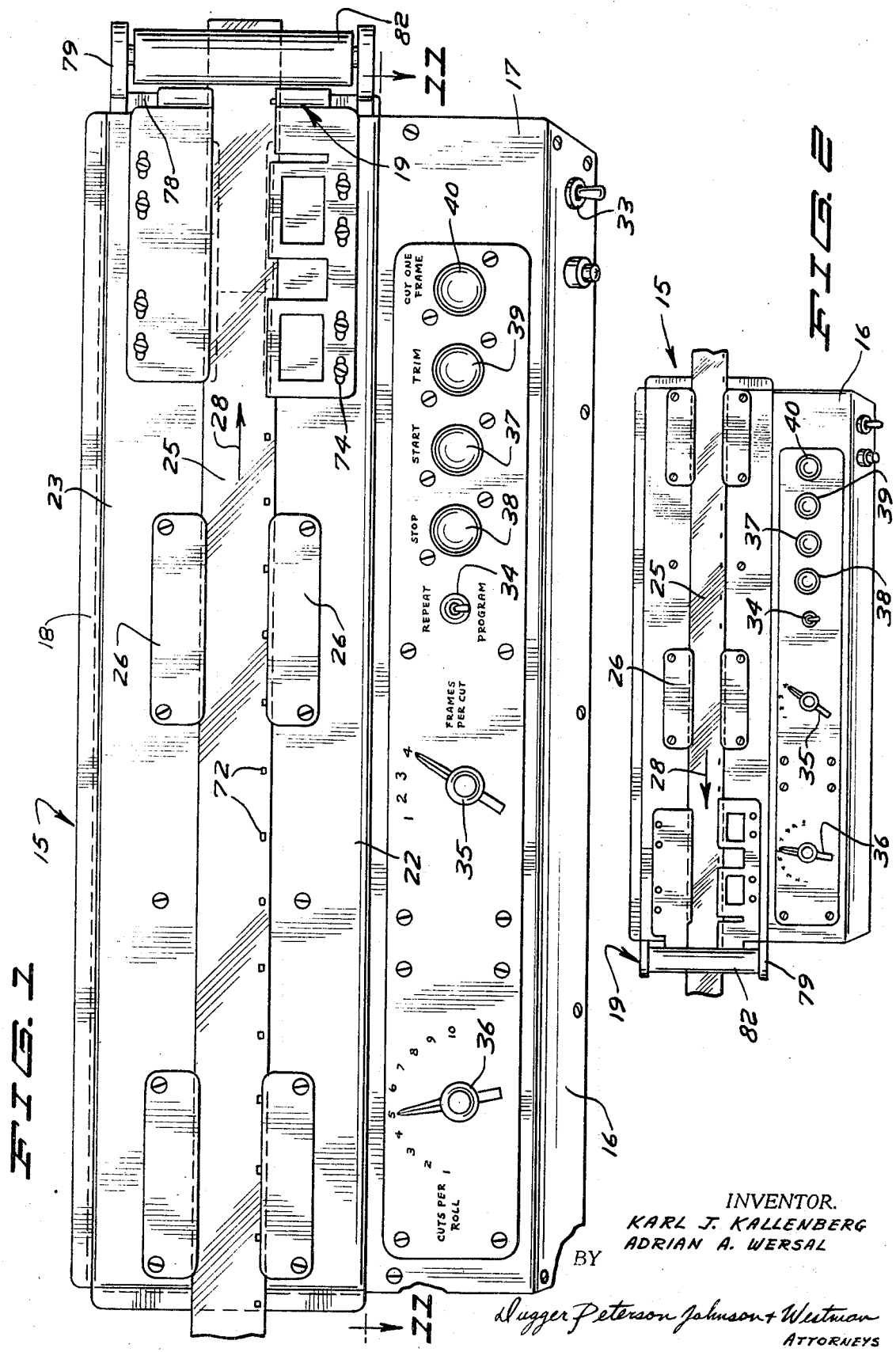

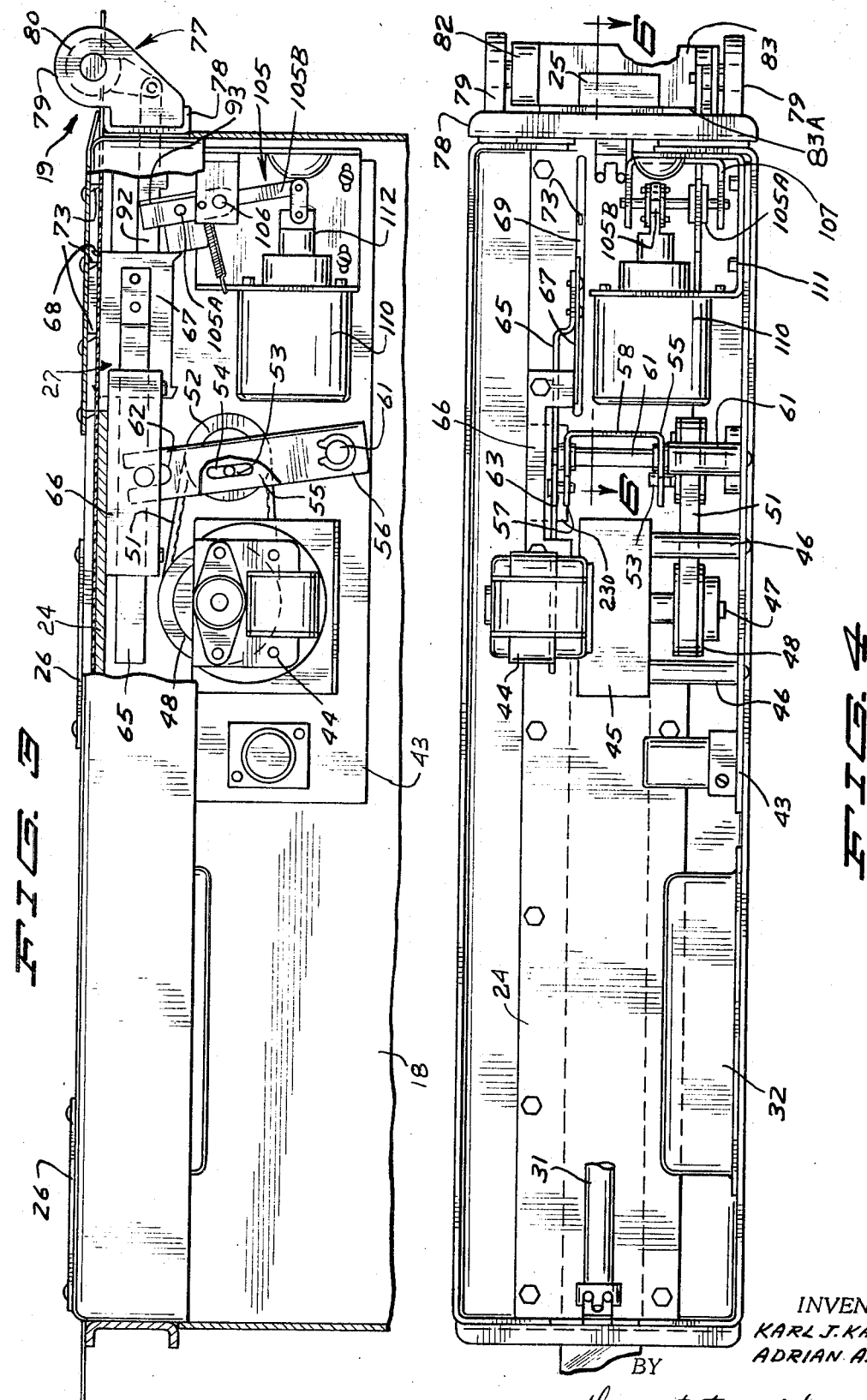

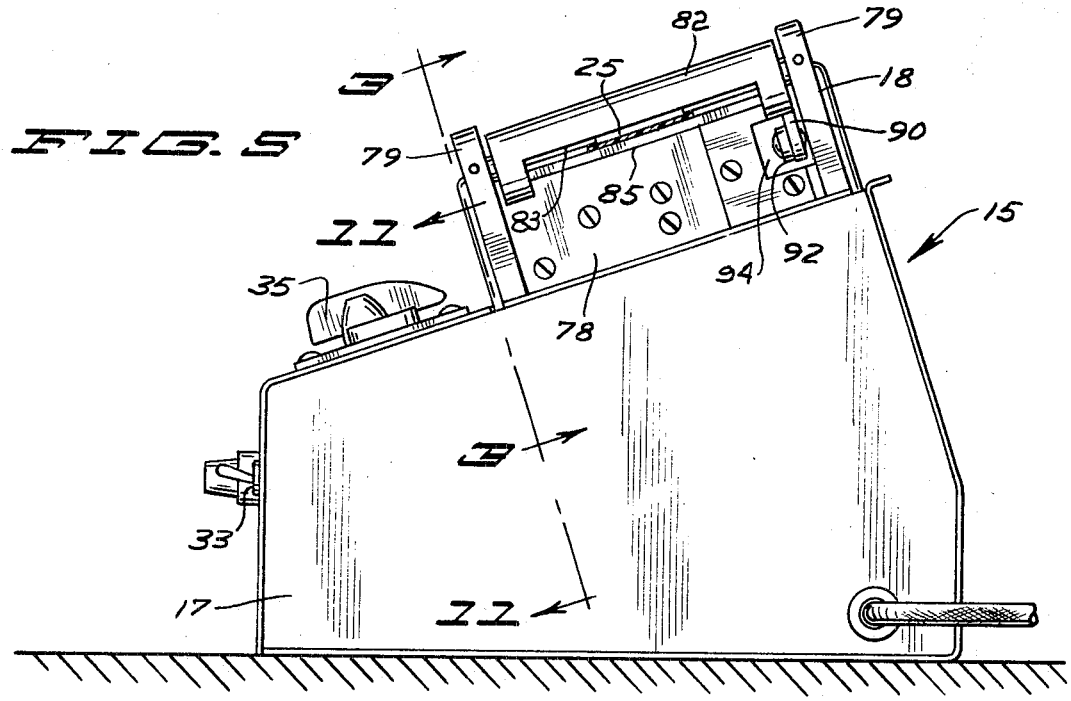
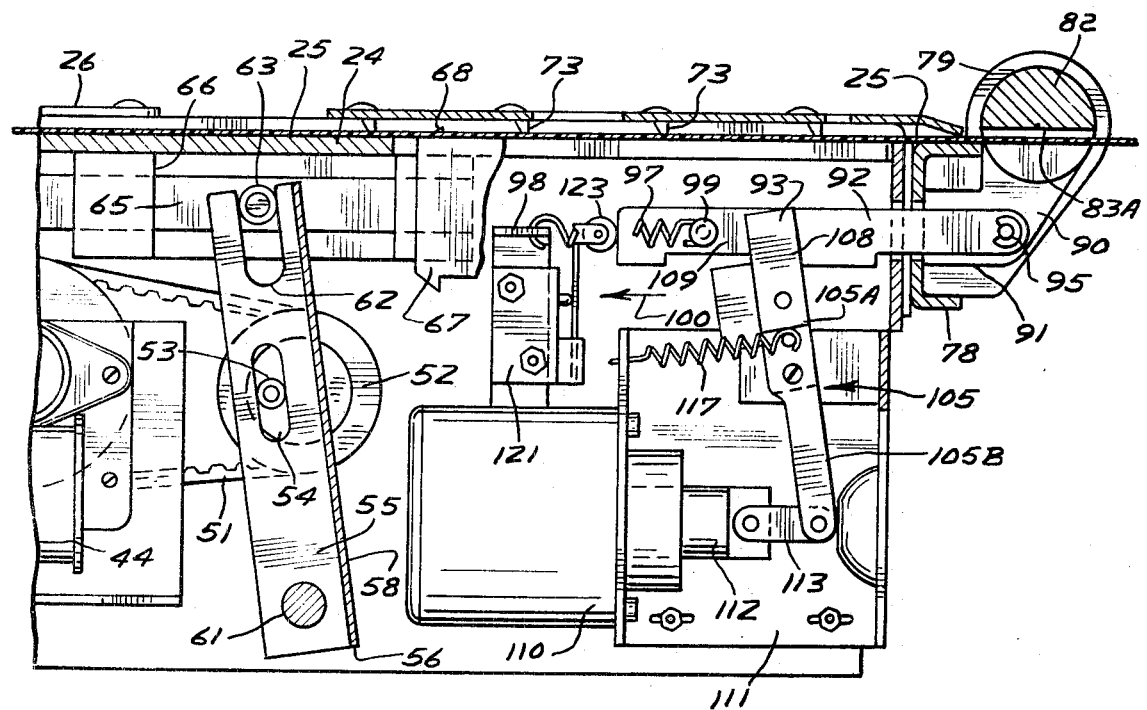

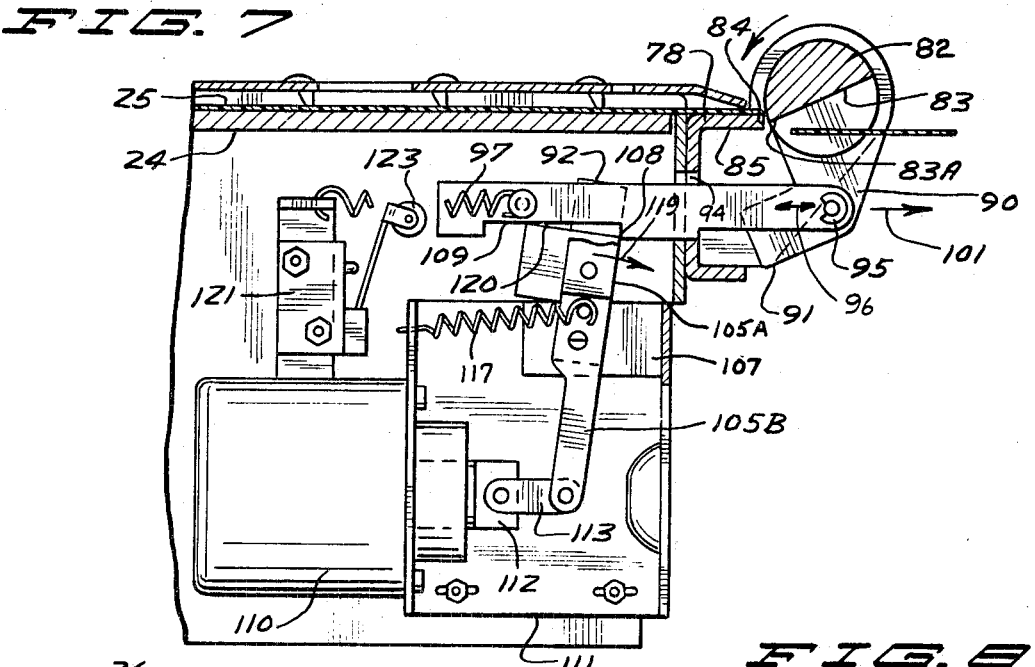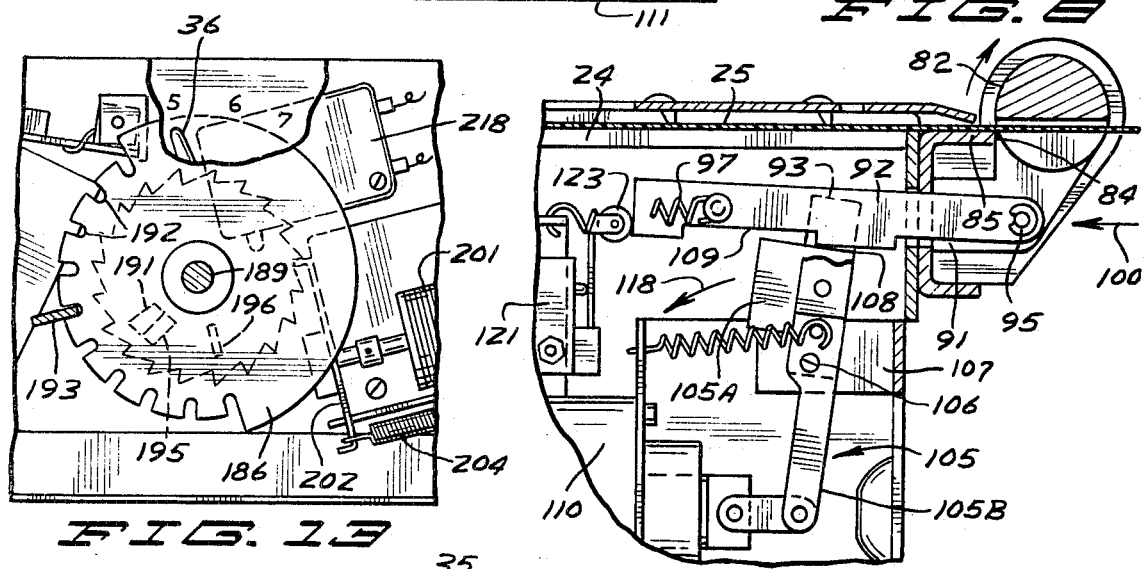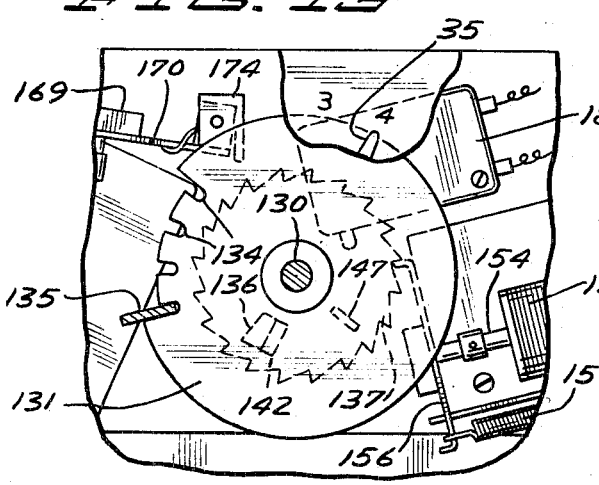

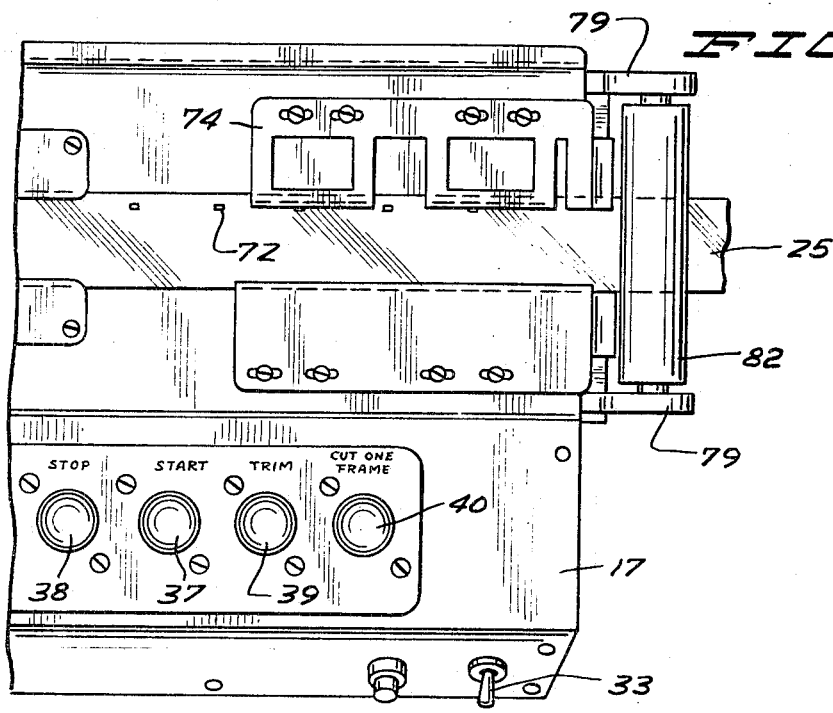
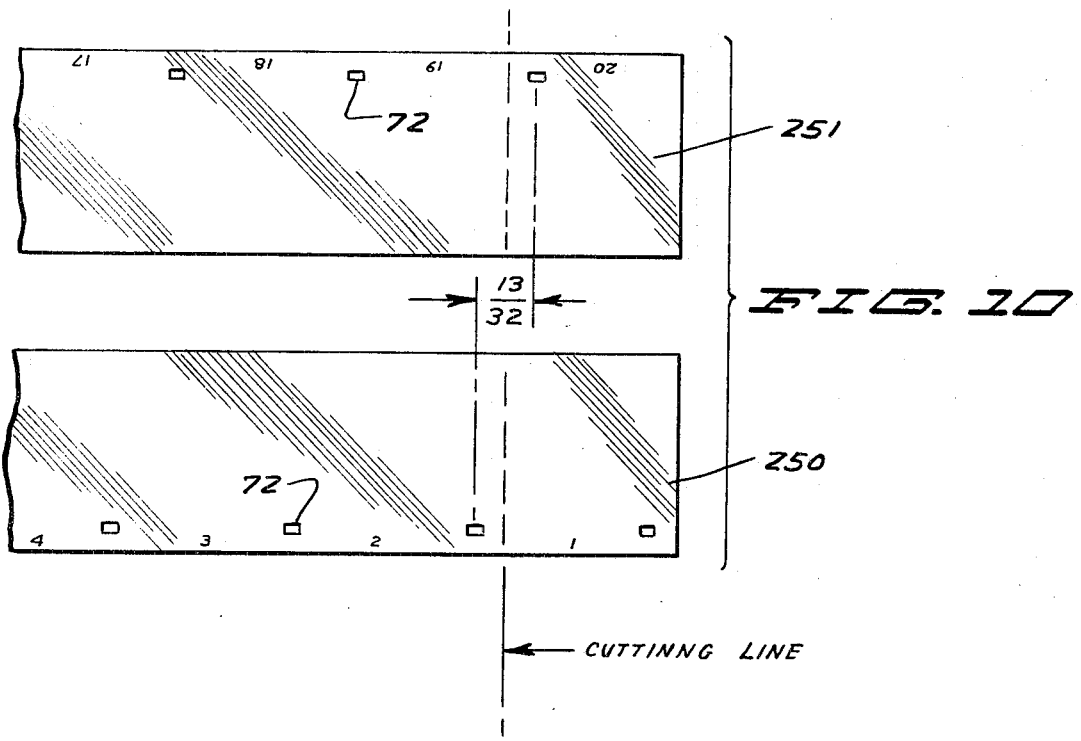

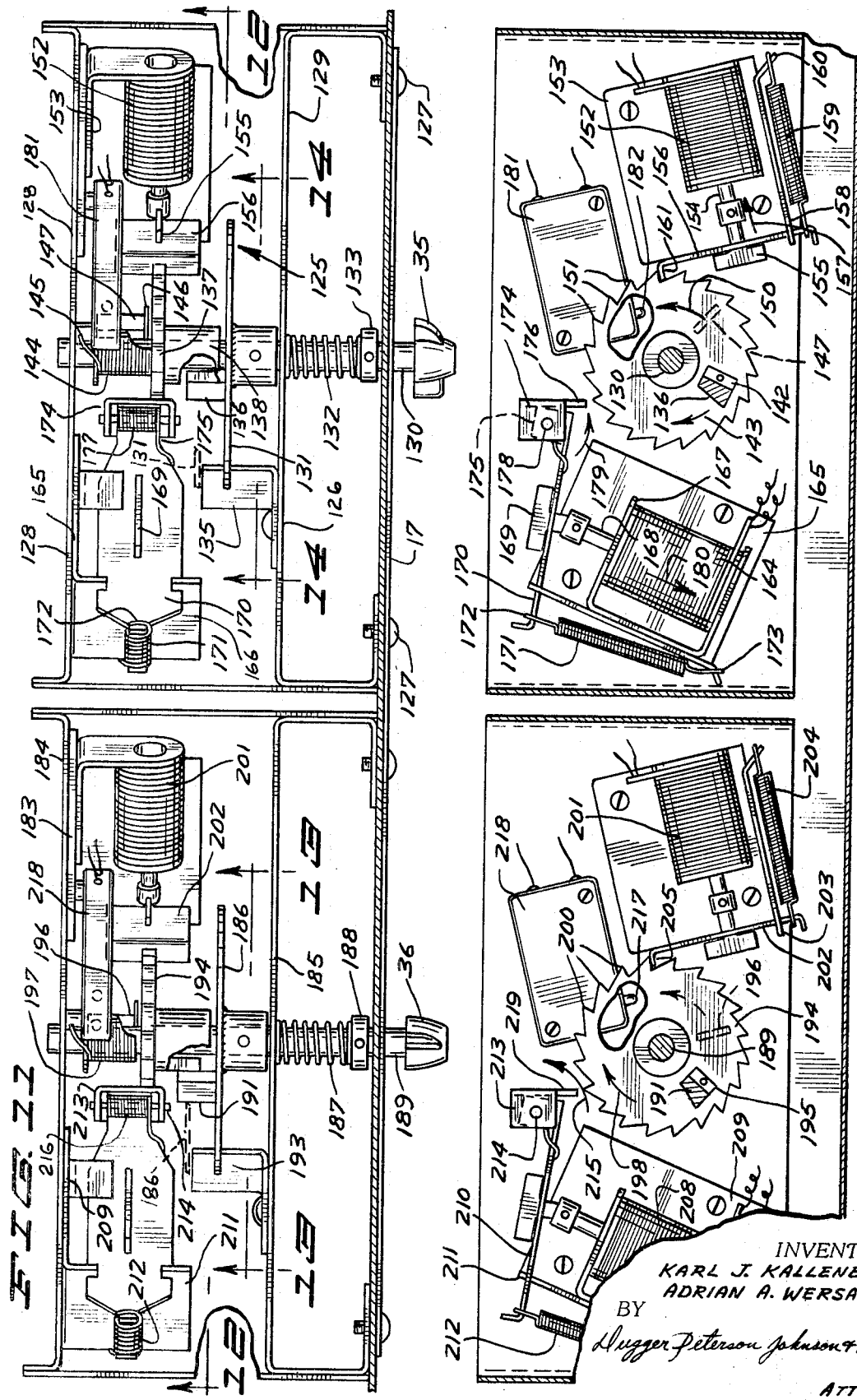

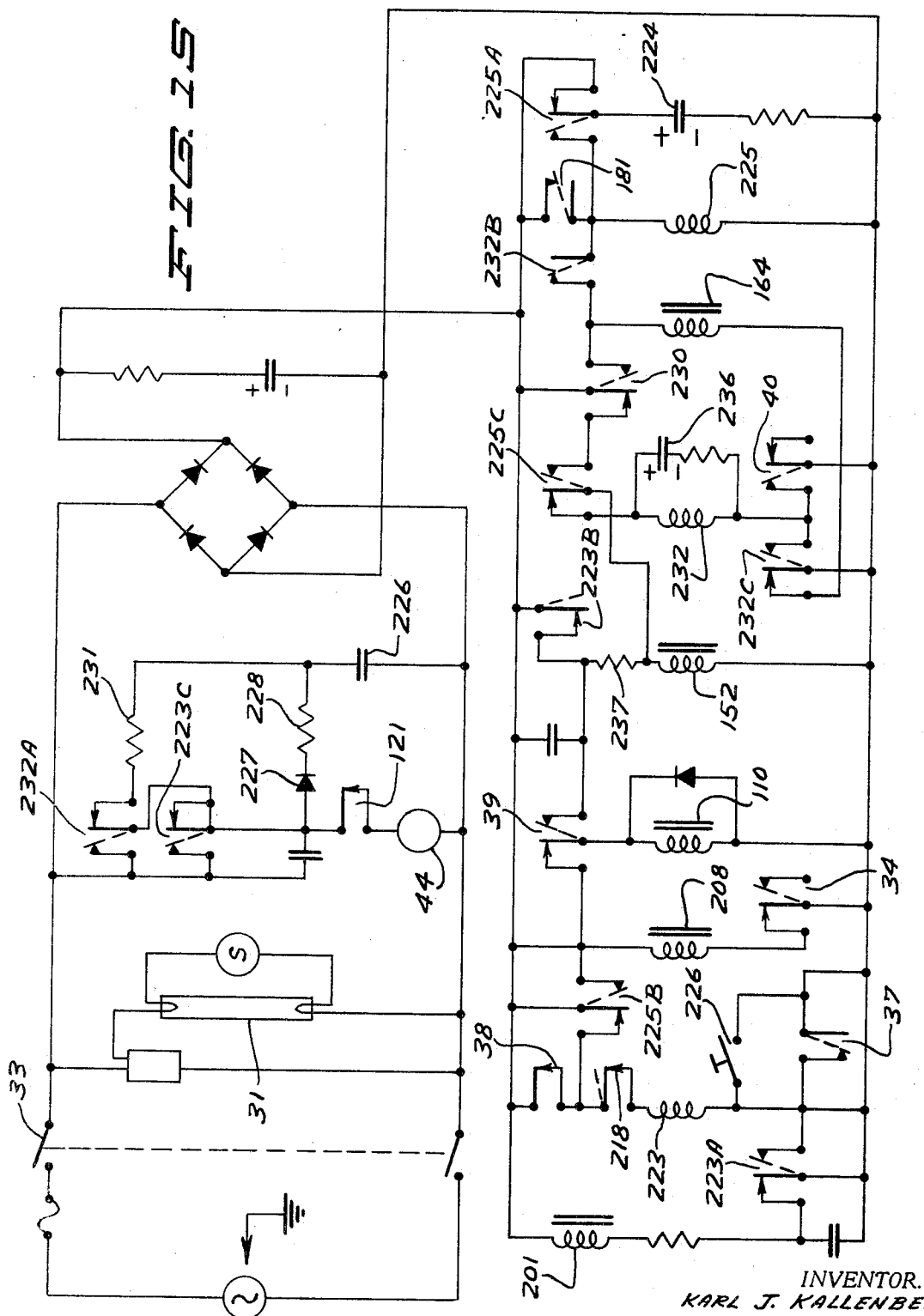

3,512,439
FILM CUTTER
Karl J. Kallenberg and Adrian A. Wersal, Minneapolis, Minn., assignors, by mesne assignments, to Pako Corporation, Minneapolis, Minn., a corporation of Delaware
Filed Sept. 25, 1967, Ser. No. 670,090
Int. Cl. B26d 5/20, 1/30
U.S. Cl. 83—242                                                            15 Claims

ABSTRACT OF THE DISCLOSURE

A film cutter which can be used for viewing and automatically advancing and cutting film which has been processed. The cutter is designed for use in a continuous system wherein the film has apertures along one edge thereof only and which apertures are indexed in relation to the images or frames on the film. The cutter permits the selection of the number of frames in each of the cut strips, and the number of cuts that will be made before the machine will stop. The unit uses a light table for viewing the negatives, a pawl advancing mechanism which will reciprocate to advance the film one frame each time it operates, and includes interlocks which will operate the mechanism so that a predetermined number of frames pass through the cutter before the cutter is actuated. A rotary type cutter is utilized for cutting the film into the desired segments.

BACKGROUND OF THE INVENTION

Field of the invention

This invention relates to devices for automatically viewing, advancing and cutting film which has been processed.

The prior art

At the present time, the trimming of films which have been processed into strips that will fit into an envelope is largely a manual process. This is due to the fact that in most films there is no way of indexing the frames on the film to drive apertures on the film itself.

However, with the advent of the cartridge films, such as the "Kodak" 126 film made by the Eastman Kodak Company of Rochester, N.Y., the images or frames on the film are indexed with respect to the apertures in the film.

SUMMARY OF THE INVENTION

The invention thus relates to a device which will receive processed film from a storage roll, index it, and advance it so that a predetermined number of exposed frames are in a strip of film, cut the film, and repeat the cycle. The features include a rotary cutting knife which operates positively, a pawl film feeding mechanism and programming stepping switches which permit the number of frames per cut to be selected, as well as the number of cuts that are to be made before the machine must again be started.

The exposed film is moved along a back lighted surface so that the images on the film can be viewed and compared with prints that have been made of the film. The correct pictures will then be placed with the correct negatives in the mailing enevlope. The unit is adaptable for right- or left-hand feed merely by switching one portion of the machine end for end.

BRIEF DESCRIPTION OF THE DRAWINGS

FIG. 1 is a top plan view of a film cutter made according to the present invention;
FIG. 2 is a top plan view of the device shown positioned for left-hand operation;
FIG. 3 is a fragmentary view of the film drive mechanism used with the device of FIG. 1 and as taken along line 3—3 in FIG. 5 with parts in section and parts broken away;
FIG. 4 is a bottom plan view of the device of FIG. 3;
FIG. 5 is an end elevational view of the device of FIG. 1;
FIG. 6 is a sectional view taken as on line 6—6 in FIG. 4;
FIG. 7 is an enlarged sectional view of the knife actuating mechanism of the present invention;
FIG. 8 is a fragmentary view showing the knife after it has returned to its normal position;
FIG. 9 is a fragmentary top view of the device of FIG. 1 showing the machine set up for running the film through the device backward;
FIG. 10 is a schematic view showing the offset between the indexing apertures on the processed film and the cutting line between frames when the film is run backward;
FIG. 11 is a sectional view taken as on line 11—11 in FIG. 5;
FIG. 12 is a sectional view taken as on line 12—12 in FIG. 11;
FIG. 13 is a fragmentary sectional view of a selector switch assembly taken as on line 13—13 in FIG. 11;
FIG. 14 is a sectional view taken as on line 14—14 in FIG. 11; and
FIG. 15 is a schematic representation of an electrical control circuit used with the device of FIG. 1.

DESCRIPTION OF THE PREFERRED EMBODIMENT

A film cutting device is illustrated generally at 15. The device includes an outer cabinet 16 which is divided into a base section 17 and an upper section 18. The upper section 18 comprises a sub-assembly housing, a viewing lamp, and all of the film drive and cutting components, and these components are physically connected only with electrical wires to the lower section. This means that the entire upper section 18 can be lifted from the base section 17, after suitable fastening screws have been loosened, and switched end for end as shown in FIG. 2, so that the cutter assembly illustrated generally at 19 is at the opposite end of the machine. The fasteners are symmetrically located to permit the switching. This permits the machine to be used to either left- or right-hand operation.

The upper section, in addition to the cutter assembly shown generally at 19, has a front table portion 22, a rear table portion 23 and a translucent panel 24 between these two portions. The tables form a guide for a strip of processed film 25 which is retained with suitable film guides 26 spaced along the tables. The film guides hold the film 25 in place over the translucent panel. Adjacent the cutter assembly 19, there is a film feeding or actuating assembly 27 that reciprocates when powered and forces the film to move in direction toward the cutter assembly 19 as indicated by arrow 28. The film holddown clips adjacent the cutter assembly are specially designed.

A lamp 31 is mounted below the translucent panel 24 and provides a back lighting for viewing images on the film strip 25 that is being moved along the unit. The lamp is an elongated fluorescent type lamp that has a ballast 32 of conventional design, and extends for substantially the entire length of the upper section 18 of the unit.

The unit has a main on-off switch 33 which controls the power to the lamp and to the rest of the components and a selector switch 34 which can be either put to a "program" position as shown in FIG. 1, or to a "repeat" position according to the dictates of the usage. The unit has a frames per cut dial 35 which can be set to control the number of frames of the exposed film in each cut film length. The dial 35 can be set to the numeral desired, and feed mechanism will move the film ahead this number of frames before each cut is made. If the dial is set to four as shown, the actuating assembly 27 for the film will operate four times to move four frames of the film 25 through the cutter assembly 19 before the cutter assembly is actuated. A "cuts per roll" selector 36 is used to program the number of cuts that will be made before each program ceases. For example, in a twenty exposure roll of film, there are twenty frames. This means that having four frames in each cut strip, there should be five cuts before a single roll is finished. Then before another roll is started the film is retrimmed. As shown here, a program will be completed after the machine has made five cuts.

A start switch 37 will initiate the programming action by starting up the movement of the actuator assembly and the cutter assembly and a stop switch 38 will stop the unit when it is in "repeat" position. A trim button 39 is used to actuate the cutter assembly 19 once to trim off any film extending through the cutter. In addition there is a switch 40 labeled "cut one frame" which, when pushed, will actuate the film actuator one frame length and then the cutter assembly 19 will cut once. This means that only the one frame will be trimmed off and no further work will be done until the program is again initiated.

When working from a master roll where several twenty or twelve exposure rolls of processed film have been presliced together, there is usually one blank frame between the individual rolls. Thus, assuming that the film is made up into such a master roll and the cutter is in "program" position it will cut each of the individual rolls into the desired number of strips, with the desired number of frames in each strip, and then will stop until the unit has been actuated to cut off the blank frame between individual rolls and the program restarted. In the "repeat" position the unit operates continuously and severs the film into strips with the desired number of frames per cut strip until it is stopped.

FILM STRIP DRIVE

The film strip drive mechanism is perhaps shown best in FIGS. 3 and 4. The upper section 18 of the housing includes a depending support plate 43 which is fixed to the upper section and extends downwardly therefrom into the lower section. The support plate 43 supports an electric motor 44 having an integral reduction gear drive 45 on its output shaft. The motor is mounted on suitable support studs 46. An output shaft 47 for the gear reduction unit 45 has a drive pulley 48 drivably mounted thereon. A belt 51 is mounted on the pulley 48 and drives another pulley 52 that is rotatably mounted onto a suitable stud extending out from the plate 43. The pulley 52 has a crank pin 53 mounted on one side thereof. The crank pin 53 fits within a slot 54 defined in a leg 55 of a channel shaped member 56. The channel member has a second leg 57 parallel to leg 55 and a base 58. The channel 56 is pivotally mounted adjacent one end thereof to a shouldered pin 61 that is fixedly attached to the plate 43. The shoulder on pin 61 spaces the channel in proper alignment so that the leg 55 can be driven by the crank pin 53.

At the opposite end of the channel 56 in each of the legs 55 and 57 there is a slot 62 defined. Each slot 62 is of size to receive a pin 63 which in turn is fixedly attached to and extends outwardly from a slide 65 of a film actuator assembly 27. The slide member 65 is slidably mounted in a block 66 fixedly attached to the cabinet of the unit. The slide member 65 includes a film actuator 67 that is fastened to one end of the slide member and which has small one-way dogs 68 that extend through a provided slot 69 in the translucent panel 24 and which engage apertures 72 adjacent one side of the film strip 25. The one-way dogs 68 are made so that they will drive the film in direction as indicated by arrow 28 by having a straight face of the dog driving against the edge of the aperture 72 which they enter. It can be seen that when the motor is energized, the crank pin 53 on pulley 52 will cause the channel 56 to move in an arc about its shaft 61 and this in turn will cause the pin 63 on the siled 65 to be driven back and forth in a reciprocating manner.

When the dogs move in direction as indicated by arrow 28, the film will be driven in this direction. When the dogs move in opposite direction during the film feeding cycle, two pair of spaced retainer dogs 73 attached to a spring loaded front film hold-down assembly 74 enterd the apertures along the side of the film strip 25 and will prevent the film from moving in direction opposite that indicated by arrow 28. This will permit the dogs 68 on the slide 67 to slip out of the apertures by lifting the film slightly as they slide rearwardly to get another "bite" at a new set of apertures and again move the film forwardly in direction as indicated by arrow 28 one frame length.

Thus, when the motor 44 is energized, and the channel 56 is being driven, the channel is adjusted so that the slide 67 reciprocates the same distance as the length of one frame of the film strip 25. This means that the dogs 68 will first engage two apertures 72, when they are in their rearward position, and will move forwardly or in direction as indicated by arrow 28 dragging the film into the cutter assembly 19 until the channel reaches the end of its stroke. At this point, the dogs 73 will enter these same apertures to prevent the film from moving rearwardly and as the pulley 52 continues to rotate, the slide 67 will be moved rearwardly. The dogs 68 will slip out of the apertures and the film will remain in position. The dogs will then get a new bite and will again advance the film through the cutter one frame length.

A feed switch 230 is mounted on the cabinet in position so that it is actuated by the channel just as the channel completes a feeding stroke.

CUTTER ASSEMBLY

Also shown in FIGS. 3, 4, 7 and 8 is the cutter assembly 19. The cutter assembly includes a rotary knife assembly 77 stationed at one end of the upper section 18 of the cabinet. The rotary knife assembly includes a mounting member 78 which is fastened to one end wall of the cabinet. The support member 78 mounts a pair of spaced apart bearing supports 79. The bearing supports 79 have suitable bearings 80 mounted therein (one bearing in each support member) and the bearings 80 in turn are used for mounting stub shafts 81 extending from opposite ends of a rotary knife 82. The rotary knife 82 is made from a cylindrical shaft having a milled surface 83 in the center portions thereof. The surface 83 is substantially along a diameter of the cylinder and may be slightly helical, if desired. Full cylindrical end portions are left in place on the knife. The surface 83 forms two cutting edges, where it joins the normal outer surface of the cylindrical shaft. This includes the cutting edge 83A that is very close to an edge 84 of a ledge 85 on the mounting member 78. The ledge 85 has an upper surface that aligns with the surface of the translucent panel 24 so that the film strip 25 feeds from the translucent panel and then is supported by the upper surface of the ledge 85.

When the cutting unit is in its normal or non-cutting position as shown in FIG. 8, the film strip 25 will pass underneath the surface 83 without any interference. In order to actuate the rotary cutter assembly, a control arm 90 is attached to one end of the cylindrical member forming the cutter 82 and extends downwardly therefrom. The control arm 90 has a stop member 91 attached thereto which abuts against the mounting member 78 to hold the cutter 82 in position as shown in FIG. 8. The rotary knife 82 is controlled through the use of a slider 92 which extends through an opening 94 defined in the end wall and also in the member 78. The slider 92 is pivotally mounted as at 95 with a pin to the control arm 90. The slider is made so that it will move back and forth in direction as indicated by double arrow 96. A spring 97 attached between a bracket 98 and a screw 99 on the slider urges the slider in direction as indicated by an arrow 100 in FIG. 8.

Movement of the slider assembly in direction as indicated by arrow 101 in FIG. 7, is through the action of a lever assembly 105 mounted to a pivot pin 106 which is pivoted in a bracket 107 attached to the cabinet. The lever assembly 105 has an upper section 105A that has a driving forward edge surface 108 that fits within a recess 109 defined in the lower edge of the slider 92. This driving engagement is between the forward edge surface of the recess 109 and the forward edge 108 of the upper lever. A pair of guides 93 are attached to the upper part of the lever and form a saddle in which the slider is slidably retained and which guide the slider properly.

A solenoid assembly 110 is mounted onto a bracket 111 and that in turn is attached to the support plate 43. The solenoid has a linear actuator member 112 that is attached with a link 113 to the bottom end of a lower portion 105B of the lever assembly 105. The lever assembly includes the lower portion 105B and the upper portion 105A which are offset from each other for proper alignment and which are both attached to a member which is pivotally mounted. A spring 117 is attached between the bracket 111 and the lever assembly 105 above the pivot pin 106. The spring 117 urges the upper portion of the lever assembly 105 in direction as indicated by the arrow 118. When the solenoid is energized, it will cause the actuator member 112 to be pulled inwardly to move the upper end of the lever in direction as indicated by the arrow 119 (FIG. 7).

When this is done, the upper edge 108 will engage the leading edge of slot or recess 109 to drive the slider 92 in direction as indicated by arrow 101 (FIG. 7) and cause the rotary knife 82 to rotate. It should be noted, as shown in FIG. 7, that when the lever assembly 105 is moved far enough so the film has been cut as shown in this figure, the corner of the actuating portion of the lever assembly 105 in this recess 109 will clear the front edge of the recess. The rear section 120 of the actuator part of the lever assembly 105 will lift up the slider 92 so that the slider will disengage the edge 108 of the lever. This will cause the spring 97 to immediately return the slider 92 back to its original position with the stop member 91 against the mounting member 78 as shown in FIG. 8 even though the drive (solenoid 110) is still energized. When the solenoid is de-energized, the spring 117 will return the lever assembly 105 to its normal position which is shown in FIG. 3. A rubber bumper is provided as a stop for the lower part of the lever. The normal position is with the actuator portion of the lever assembly cocked and ready to engage the front surface of recess 109 of the slider. Thus the rotary knife will automatically be returned to a ready position after completing its cutting stroke whether the solenoid 110 is de-energized or not.

It should be noted that the guides 93 are a part of and move with the upper part 105A of the lever so that the slider is guided in this manner while it is moving. The actuator edge 108 of lever assembly 105 is in between the guides 93. The knife will be actuated only until the rear portion 120 of the actuator part of the lever lifts the slider out of the way and lets the spring 97 return the slider to its original position.

The film strip will be moved by the actuator mechanism, through the knife assembly 19 and depending on the controls, the knife will be actuated after the actuator mechanism has advanced the desired number of frames of film through the knife.

A safety switch 121 is provided so that when the slider 92 is forward or in its cutting position as shown in FIG. 7, the switch will be open. The small roller 123 contacts the back end of the slider when the slider is returned by spring 97 to its home position. When the switch 121 is open as when the slider is in its forward position, the circuit to motor 44 is broken and the actuator mechanism will not operate during the cutting cycle.

SELECTOR ASSEMBLIES

The actuator mechanism motor 44 is controlled through both the "cuts per roll" assembly set by knob 36 and the "frames per cut" assembly set by knob 35. The frames per cut assembly permits the motor to operate a desired number of revolutions so that the actuator mechanism will advance the film the desired number of frames before each cut is made. The electrical interlock between the various advancing and cutting functions and the programming of the machine will be more fully explained in connection with the electrical schematic diagram, but in FIGS. 11–14, the mechanical operating apparatus for these two selector assemblies is shown.

Each of the assemblies is basically a stepping switch and is ratchet operated so it will step, or move one position each time the film is advanced one frame, in the case of the frames per cut assembly or will advance one positon each time a cut is made in the case of the cuts per roll assembly.

First, referring to the frames per cut assembly shown generally at 125, it can be seen that this assembly is mounted inside the lower portion 17 of the cabinet and inclues an outer frame 126 suitably fastened to this cabinet with screws 127. The frame includes a rear wall 128 and an intermediate wall 129 as well as the side walls that hold the unit together. A rotatably mounted, axially slidable actuator shaft 130 extends through the front wall of the cabinet, the intermediate wall 129 and the rear wall 128 of the frame. The actuator shaft mounts a stop wheel 131 which is drivably mounted on the shaft and which has a hub that bears against the rear side of the intermediate wall 129. A spring 132 is slidably mounted over the actuator shaft on the opposite sides of wall 129 and is held in place with a pinned collar 133. The spring urges the shaft in direction toward the outer wall of the cabinet and causes the hub of the stop wheel to bear against the wall 129. This holds the shaft in position, but the shaft can be slid in opposite direction for setting purposes against the action of spring 132. The shaft extends through the wall, as shown, and is supported thereby. As shown perhaps best in FIG. 14, the stop wheel 131 has four notches 134 defined in the outer periphery thereof and each of these notches is made so that it will fit over the and receive the stop lug 135 that is fastened to the rear side of the intermediate wall 129. The stop lug 135 is L-shaped, and one leg is fastened to the wall 129 and the other leg extends outwardly therefrom so that it is positioned wherein it will fit into the notches 134.

When the lug 135 is in one of the slots 134 on the stop wheel 131, the shaft 130 cannot rotate. The wheel and shaft will be held from rotation by this stop lug. However, the shaft can be slid axially against the action of the spring 132 to position as shown in dotted lines in FIG. 11 wherein the stop wheel clears the lug 135 and then the shaft can be rotated to a new position or in other words to a position wherein a new notch 134 would be engaging the stop lug. As shown on the dial of the machine in FIG. 1, there are four numbers by the indicator handle 35. Each of the numbers indicates a different slot 134 engaging the stop lug 135.

The stop wheel 131 also carries a rearwardly extending lug 136 which extends in axially direction and is radially spaced from the axis of rotation of the shaft. A ratchet wheel 137 having a hub 138 is slidably mounted on the shaft 130. The ratchet wheel has an axially extending lug 142 which is the "home" position lug that engages the rearwardly extending lug 136 on the stop wheel 131. This will prevent the ratchet wheel, which is rotatably mounted on the shaft 130, from rotating past this home position in direction as indicated by the arrow 143 in FIG. 12.

The shaft 130 has a torsion spring 144 mounted thereover to the rear of the ratchet wheel 137. One end 145 of the spring 144 is held by a washer that is fixed to the shaft 130, and the other end of the spring 146 engages an actuator lug 147 that is fixed to the ratchet wheel 137 and extends rearwardly therefrom in axial direction. The torsion spring 144 urges the ratchet wheel to move in direction as indicated by arrow 143.

Thus unless there is something holding the ratchet wheel from rotating, the ratchet wheel will always rotate to its home position with the lug 142 against the lug 136 of the stop wheel 131.

Movement of the ratchet wheel in direction as indicated by arrow 150, which is opposite from the direction indicated by arrow 143, is controlled through the use of two pawls acting on the teeth 151 of the ratchet wheel.

As can be seen, the peripheral teeth 151 form a plurality of ratchet teeth actuable in one direction. A first solenoid 152 is mounted onto a bracket 153 that is attached to the rear wall 128 of the frame and which has a leg extending outwardly to mount the rear portion of the solenoid. The solenoid has an actuator shaft 154 that moves in axial direction when the solenoid is energized. The actuator shaft 154 is connected to a link 155 which passes through an opening in a pivoted lever 156. The link 155 has a head thereon which will exert a force against the pivoted lever when the shaft 154 moves in direction as indicated by arrow 157. The lever is held in place by this link and also is pivotally retained where it passes through an opening in a plate 158 attached to the bracket 153. A first end of a spring 159 is attached to the lower part of the lever 156 below the plate 158. The second end of the spring 159 is attached to a lip 160 formed in the plate 158. This spring action forces the upper part of the lever to move toward the periphery of the ratchet wheel 137. The upper end of the lever has a small bent over lip 161 that engages the forward or stop edge of one ratchet tooth 151 will prevent the ratchet from moving in direction as indicated by arrow 143 whenever the solenoid 152 is relaxed. When the solenoid is energized, the lip 161 will clear the teeth and the ratchet will move under the urging of the torsion spring 144 in direction as indicated by arrow 143.

A second solenoid 164 for the "frames per cut" assembly is mounted onto a bracket 165 that is also attached to the rear wall 121 of the frame. The bracket 165 includes a leg 166 extending outwardly from the wall 128 back toward wall 129 and leg 166 has a second U-shaped bracket 167 that actually mounts the solenoid 164. The solenoid 164 has an actuator shaft 168 that is connected to a T-shaped link 169 which passes through a lever 170. The lever 170 also fits within a provided notch in the leg 166 to form a pivot on this leg. The T-shaped head of link 169 restrains the lever in one direction. A spring 171 is attached as at 172 to the rear portion of the lever 170 and a second end of the spring is attached to a lug 173 on the bottom of the leg 166. The outer end of the lever 170 has a dog assembly 174 pivotally mounted to a pair of ears 175 on the lever. The dog assembly is U-shaped and has an actuator dog 176 extending toward and in position aligned with the ratchet teeth 151 on the ratchet wheel 137. The dog assembly is mounted onto a pin 178 and a torsion spring 177 is slipped over the pin and the ends of the torsion spring are positioned with respect to the lever and the dog assembly so that the dog assembly is urged about the pin 178 in direction as indicated by arrow 179. However, the dog assembly 174 can move in a limited path in an opposite direction.

When the solenoid 164 is energized, the shaft 168 will be retracted in direction as indicated by arrow 180 and this will cause the T-shaped head of the link 169 to pull the lever 170 downwardly about its pivot on leg 166. This in turn will cause the dog 167 to engage the closest ratchet tooth on the ratchet wheel 137 and pull the ratchet wheel about the shaft in direction opposite from that indicated by arrow 143. The solenoid 164 is set so that it will advance the ratchet wheel in this direction slightly greater than one tooth spacing. If the solenoid 152 is not energized, then the lever 156 will slip over a ratchet tooth on that side of the ratchet wheel and the lip 161 will engage the next tooth in line and hold the ratchet wheel against rotation in direction indicated by arrow 143. Then when the solenoid 164 is relaxed, the dog assembly 174 will be urged away from the ratchet wheel by spring 171. The torsion spring on the dog assembly permits the dog assembly to pivot slightly out of the way to clear the tooth it has engaged and return to its position as shown in solid lines in FIG. 12. The ratchet wheel is thus advanced one tooth each time the solenoid 164 is energized, until solenoid 152 is energized to reset the stepping mechanism.

A switch 181 is mounted to the rear wall 128 of the frame, and has an actuator button 182 that is positioned to be intercepted by and contacted by the actuator 147 on the ratchet wheel 137. The switch 181 is used in the circuit to interlock the frames per cut system with the number of cuts per roll. When the solenoid 152 is energized, the lever 161 is released to permit the ratchet mechanism to be reset to its original position with lug 142 on the ratchet wheel contacting the stop lug 136 on the stop wheel 131.

CUTS PER ROLL MECHANISM

The actuating mechanism for the cuts per roll device is exactly the same as for the frames per cut mechanism. The cuts per roll selector button 36 is attached to a shaft 189 that extends from the front wall of the cabinet, and is mounted to a frame 183 comprising a rear wall 184 and an intermediate wall 185. A stop wheel 186 is drivably mounted onto the shaft in a suitable manner and is spring loaded with a spring 187 acting between wall 185 and a collar 188 so that the shaft is urged toward the front of the cabinet until the hub of the stop wheel strikes the wall 185. The stop wheel has a rearwardly extending stop lug 191 and a plurality of inwardly extending notches 192 defined in the peripheral edge thereof. The notches 192 are of size to receive and be retained by a stop leg 193 which forms part of a bracket attached to the wall 185.

A ratchet wheel 194 is rotatably mounted on the shaft 189 and has a home position stop lug 195 extending forwardly in position to interfere with the lug 191 as the ratchet wheel rotates, and an actuator lug 196 extending outwardly from the opposite side of the ratchet wheel. A torsion spring 197 is mounted over that shaft 189 and is designed to urge the ratchet wheel to rotate in direction as indicated by arrow 198, until the lug 195 contacts stop lug 191. The ratchet wheel has ratchet teeth 200 on the periphery thereof and these ratchet teeth are used for rotating the ratchet wheel against the urging of the torsion spring 197.

A first solenoid 201 is mounted to the rear wall 184 of the frame and is used to actuate a lever 202 that is pivoted to a lower leg 203 of the mounting bracket and is held into engagement with the ratchet teeth through the use of a spring 204. The lever 202 has a lip 205 that engages one of the ratchet teeth 200 and stops the ratchet from rotating in direction as indicated by arrow 198.

A second solenoid 208 is mounted on a bracket 209 to the rear wall of the frame for the frames per cut assembly and this solenoid has an actuator which controls movement of a lever 210 that is pivoted to a leg 211 of the bracket 209. A spring 212 urges the lever in direction so that the outer end of the lever moves away from the ratchet wheel 194. The outer end of the lever has a dog assembly 213 mounted thereto on a pin 214. The dog assembly is urged about the pin in direction as indicated by arrow 215 through the use of a torsion spring 216. The dog assembly 213 will pivot about pin 214 for a small distance. The dog assembly 213 has an actuator dog 219 that is aligned with the teeth 200 on the ratchet wheel 194. When the solenoid 208 is actuated or energized, the solenoid will pull the lever 210 in direction so that the dog 219 engages an adjacent ratchet tooth 200 and rotates the ratchet wheel in direction opposite that indicated by arrow 198 a distance equal to slightly more than one tooth spacing so that the lip 205 will move from the tooth it is resting upon to the next tooth and will again retain the ratchet wheel from rotation in direction as indicated by arrow 198.

The solenoids on the "cuts per roll" assembly will be operated in response to the energization of the cutter knife. Each time the cutter knife operates the ratchet will be moved to rotate the ratchet wheel one tooth spacing. When the ratchet is moved far enough, the actuator lug 196 will contact an actuator button 217 on a switch 218 used to indicate when the desired number of cuts have been made.

The cuts per roll button can be adjusted in the same manner that the frames per cut button is merely by pressing the button axially in so that the wheel 186 clears the leg 193 and then the shaft can be rotated to a new detented position. The rotation of the shaft rotates the stop lug 191 to a new position meaning that the distance between the stop or home position of actuator lug 196 and the point where it contacts button 217 will be changed. Each notch 192 represents a movement of one ratchet tooth so that the number of cuts made from the start of a cycle until button 217 is contacted can be changed. Solenoid 201 is used as a reset solenoid and when energized will pull lever 202 to position so that lip 205 clears all the ratchet teeth and the ratchet will automatically reset under the urging of spring 197 by rotating in direction as indicated by arrow 198 until the lug 195 contacts stop lug 191.

CONTROLS AND OPERATION

Referring now to the schematic wiring diagram in FIG. 15, the main switch 33 (from an A.C. source) will power the lamp 31 when it is closed as shown. At the same time the main switch 33 is closed, the frames per cut release solenoid 152 is energized through normally closed contacts 223B of a set of contacts controlled by relay coil 223. A rectifier is used to supply power to the relay coils and solenoids. When the frames per cut release solenoid 152 is energized, the lip 161 will be pulled away from the ratchet teeth 150 of the wheel 137 and the spring 144 will return the wheel to its home position with lug 142 against the stop lug 136. Also, the cuts per roll release solenoid 201 is energized through normally closed contacts 223A which are also controlled by the relay coil 223 when it is energized. Energization of the solenoid 201 releases lip 205 from the teeth 200 on the ratchet wheel 194 and this will permit the spring 197 to return the ratchet wheel to its home position with the lug 195 against the stop lug 191. This means that the unit is reset as soon as the power switch 33 is on. At the same time, a capacitor 224 is charged up through a set of normally closed contacts 225A. The contacts 225A are controlled by a relay coil 225.

In addition to the start switch 37 shown in FIG. 1, the unit has a plug-in for use with a foot switch 226 which can be used for controlling the operation of the device. The foot switch would be normally used so that part of the operation can be controlled with the foot of the operator. Assuming that the "start" switch 37 is manually closed, relay coil 223 will be energized through the normally closed cuts per roll switch 218 (the actuator lug 196 will be moved away from the switch) and through the normally closed stop switch 38 or through normally closed contacts 225B that are controlled by relay coil 225.

When relay coil 223 is energized, the normally open side of contacts 223A close as hown in dotted line to lock on the relay (bypassing the start and foot switches). Moving contacts 223A to their dotted position breaks the circuit to the cuts per roll release solenoid 201 permitting the spring 204 to pull the lever 202 so that the lip 205 engages a tooth 200 on the ratchet wheel 194. Further, normally closed contacts 223B are opened and this will relax the frames per cut release solenoid 152 which permits lever 156 to be urged by spring 159 so that the lip 161 of lever 156 engages a tooth 151 on the ratchet wheel 137. The lips 161 and 205 then are ready to act as pawls in the ratchet action on the ratchet wheel. A third set of contacts 223C controlled by relay coil 223 move to dotted position and this will energize the drive motor 44 through the cut safety switch 121 (which is a normally open switch but is held closed when the slide is in its home position). At the same time, the contacts 223C in their dotted position cause a capacitor 226 to be charged. This capacitor is charged through a diode 227 and a resistor 228.

The motor 44 drives the crank pulley to advance the film by operation of the channel 56 acting on the slide and actuator 67. When the film has advanced forwardly as far as it will go, the feed switch 230 is operated by the channel 56. As shown, the feed switch 230 has two sets of contacts, one normally closed and one normally open. The normally open contacts are closed when the feed switch is actuated, which is the dotted position in the circuit diagram. Moving of this switch 230 to its dotted position supplies power to the frames per cut step solenoid 164. When this solenoid 164 is energized, it pulls lever 170 down causing the dog 176 to engage a tooth on the ratchet wheel 137 and rotate the ratchet wheel in direction opposite that indicated by arrow 143 one tooth spacing. That means the lip 161 will ride over and fit in back of the next tooth in line and when solenoid 162 releases, hold the ratchet from rotating under the urging of spring 144. The actuator lug 147 will be thus one step closer to the button 182 on the switch 181. The film feeding cycle is then repeated as the motor continues to run. The feed switch will return to its normal position as the motor continues to drive the actuator channel and it is only momentarily actuated. On the next cycle, the feed switch is again moved to its dotted position by the channel 56 as the film actuator reaches the end of its stroke again energizing the frames per cut step solenoid 164 causing the lug 147 to move still closer to the button 182. After four film advance cycles, the way the machine shown is set, the switch 181 will be operated by the lug 147 contacting the button 182, closing switch 181. This will energize the relay coil 225 moving contacts 225B to their dotted position and energizing the cut solenoid 110 through normally closed side of the trim switch 39. The cut solenoid 110 operates the cutter as previously explained to trim off the film that is extending through the cutter. The film strip would have passed through the cutter during the operation of the drive motor as explained above. Further, the contacts 225B energize the cuts per roll step solenoid 208, which causes the lever 210 to move dog 216 into engagement with the ratchet teeth 200 and rotate the ratchet in opposite direction from arrow 198 one tooth length. The lip 205 will then engage the back side of the next tooth on the ratchet and hold it in this position. The lug 196 will thus be one tooth closer to the button 217 of switch 218. The switch 218 will not be actuated until a lug 196 contacts the button 217.

The movement of the slide mechanism 92 operating the rotary knife causes the cut safety switch 121 to open, de-energizing the motor 44 until the knife returns to its home position. The motor is re-energized after the knife returns home, and the feed switch 230 is returned to its normal position. The contacts 225C, which also are controlled by the relay coil 225, move to the dotted position as shown and close a path energizing the frames per cut release solenoid 152 through the feed switch 230. When the frames per cut release solenoid 152 is energized, the lip 161 moves to position clearing the ratchet teeth 151 on the ratchet wheel 137 and the spring 144 returns this ratchet wheel on the frames per cut assembly back to its home position with lug 142 contacting the stop lug 136. This opens switch 181 controlling relay coil 225.

However contacts 225A also have been moved to their dotted position and the capacitor 224 then discharges through these contacts in their closed position and through the relay coil 225 to hold the relay coil energized for a time delay period. After the time delay, the relay 225 does relax and the contacts 225A, 225B and 225C return to their normal position.

When the contacts 225B return to normal position as shown in solid lines, the cuts per roll step solenoid 208 is de-energized and the spring 211 returns the lever 210 and the dog assembly 213 to position as shown in FIG. 12. The contacts 225C return to their normal position and the frames per cut release solenoid is de-energized so that the solenoid 152 then relaxes and the lip 161 moves to position wherein it will interfer with the teeth of the ratchet wheel 137. Contacts 225A go to their normal position and the circuit re-charging capacitor 224 is again completed and the cut solenoid 110 is released.

One cut cycle thus has been completed. Once the knife has returned to its normal position, the cut safety switch is again closed and the motor 44 continues to run. The complete cycle is repeated until the cuts per roll ratchet wheel 194 has moved to a point wherein the actuator lug 196 contacts the button 217. This, as shown, would be after five complete cutting cycles in the presently illustrated embodiment. This can be changed by moving the selector button to the desired number, which will indicate the number of cutting cycles that must be completed before the actuator lug 196 contacts the switch button 217. Once the switch 218 is opened, the relay 223 is de-energized and its three contacts 223A, 223B and 223C return to their solid line positions. Also, just prior to this, relay 225 will have been energized with the action previously described resulting.

Contacts 223A energize the cuts per roll release solenoid 201 again, but the ratchet wheel will not return to its home position until the step solenoid 208 for the cuts per roll assembly is de-energized. The dog 219 will hold the ratchet from returning to home position until this solenoid is de-energized. Contacts 223C move to break the normal power circuit to the motor 44 and a capacitor 226 is then discharged through the motor coil and through a resistor 231 and contacts 232A which are controlled by relay coil 232. This will provide a small amount of braking force to the motor to prevent it from coasting too far. However, the motor coasts far enough to allow the feed switch to return to normal. When the feed switch returns to normal, the frames per cut step solenoid 164 is de-energized and then the ratchet wheel 142 is free to return to its home position under the urging of spring 144.

After the capacitor 224 discharges through the relay coil 225, the relay 225 will be energized by switch 181 because the cut will be made before the cuts per roll unit advances to its last position. Relay coil 225 will also be de-energized and the contacts 225B will move to normal position to de-energize the cut solenoid (a cut was made when relay 225 was energized). The cuts per roll step solenoid 208 will also be de-energized then, permitting the ratches wheel 194 to return to its home position. When the contacts 225A go to their relaxed position, capacitor 224 is charged through a resistor 235. The cuts per roll release solenoid 201 and the frames per cut release solenoid 152 are both energized through contracts 223A and 223B, respectively and capacitor 224 is charged. The unit is in its initial position as before the program was started.

Because the unit has now cut a complete film of twenty which are framed into five sections of four frames each, and because normally there is a single frame between each individual film that has to be trimmed, the operator will press the "cut one from switch" 40 moving this switch to its dotted position as shown in the circuit diagram. This charges capacitor 236 and energizes the relay coil 232. The relay coil 232 energizes through contacts 225C, a resistor 237 and contacts 223B. Contacts 232A controlled by coil 232 move to dotted position; contacts 232B close and contacts 232C also move to their dotted position. Contacts 232C open the circuit to the frames per cut step solenoid 164 and hold relay coil 232 energized. Contacts 232B close to provide a path to relay coil 225 once the feed switch 230 has been actuated. Contacts 232A in their dotted position energize the motor 44 and charge capacitor 226. The motor feeds the film by operating the actuator mechanism for one rotation and after this has been done, the feed switch 230 moves to its dotted position. This energizes relay coil 225 through the contacts 232B. The operation of relay coil 225 operates all of its contacts and the cut solenoid is operated through contacts 225B. The cut safety switch of course is opened so the motor is not powered until the knife linkage returns to its normal position. Contacts 225C in dotted position break the circuit to relay 232, but the coil 232 does not become de-energized immediately due to the charge on capacitor 236. Once the cut is completed, the cut safety switch is closed and the motor will continue to run, the feed switch 230 will return to normal causing capacitor 224 to discharge through coil 225 and delay the relaxation of the coil 225. At this time the charge from capacitor 236 has dropped sufficiently so that the relay 232 relaxes and the contacts that it operates return to normal. The holding circuit through contact 232C is broken, 232B breaks the circuit to coil 225 which is no longer in effect, and contacts 232A open the power circuit to the motor 44 and provide a discharge path for capacitor 226 to provide a braking action on the motor.

The relay coil 225, by this time, has dropped out because of the discharge of capacitor 224 and the contacts for coil 225 return to their normal position. The cutter is in the state as it was when power was first applied with the cuts per roll release solenoid and the frames per cut release solenoid both energized and capacitor 224 charged. The program cycle will be again initiated when either the foot switch 226 or the start button 37 are actuated.

As shown, the program or repeat switch 34 was placed in its program position in the diagram. In its dotted position, which is the repeat position, the circuit to the cuts per roll step solenoid is broken completely. It never does step, and therefore is completely out of the program. The cycle would progress for an infinite number of cuts after so many frames had been moved. To stop the repeat cycle, the stop switch must be pressed and held for one operation of the relay 225. This will then de-energize the relay 223 (when contacts 225B are operated) and end the cycle. When in the repeat position, for example, if the frames per cut is set to four, the unit would continue to move four frames through the cutter, cut the film and repeat this cycle until the stop button was pressed.

The trim switch 39 can be pressed and moved to its dotted position which will merely operate the cut solenoid through the normally closed contacts 223B until the button for the switch 39 in released.

In FIG. 9, the device of the present invention is shown set up for running films backward from normal direction through the machine. In other words, instead of the first exposure from each of the individual rolls of film being feed into the machine in order, the last exposure is fed in first. This places the apertures 72 of the film on the opposite side of the support table.

In order to operate the machine at that time, the hold down clip 74 is switched to the top of the table and the top end hold down clip is moved to the bottom side. At the same time, the actuating mechanism 64 is reversed to the opposite side of the machine so that the actuator, the slide member, and the mounting block are all placed in reverse position. This means that the slot 62 in the leg 57 will be used for driving the pin 63 instead of the slot on the opposite leg. In Fig. 4 it can be seen that the slide block 66 would be toward the bottom of the view and then fastened in place as before. As shown in Figure 10, when a film strip 250 is insterted in the forward direction, namely with the number one frame as shown leading the film, the apertures are indexed with respect to the leading edge of each of the exposed frames.

When the device is reversed as shown in the top portion of Fig. 10, with the film strip 251, the apertures 72 are offset by 13/32 of an inch total. This means that when the unit is reversed, the pawls for actuating the film have to be advanced 13/32 of an inch from their previous position in order to accommodate this slight offset of the apertures. When the unit is reversed, the mounting brackets are made so that they will provide for this offset.

What is claimed is:

1. A film cutter comprising a housing; means on said housing for advancing a strip of film one frame at a time comprising apertures along one edge of said film indexed with respect to the individual exposures on said film, pawl means positioned below said film and drive means to reciprocate said pawl means in a linear path to move said film forwardly one frame at a time; a cutter assembly; means to mount said cutter assembly so that said film moves through said cutter assembly as the film advances; control means to actuate said cutter assembly to sever the film in response to a predetermined number of frames being advanced through the cutter assembly; and means to prevent said film from moving rearwardly when said pawl means are moved rearwardly with respect to the direction of advancement of said film.

2. A film cutter comprising a housing, means on said housing for advancing a strip of film one frame at a time, a cutter assembly, means to mount said cutter assembly so that said film moves through said cutter assembly as the film advances, control means including electrically controlled means to actuate said cutter assembly to sever the film in response to a predetermined number of frames being advanced through the cutter assembly, electrically controlled actuating means for said film advancing means, and electrical interlock means between said advancing means and said means to actuate the cutter assembly operable to actuate said cutter assembly after said advancing means has operated a preselected number of times.

3. A film cutter comprising a housing, means on said housing for advancing a strip of film one frame at a time, a cutter assembly; means to mount said cutter assembly so that said film moves through said cutter assembly as the film advances; control means to actuate said cutter assembly to sever the film in response to a predetermined number of frames being advanced through the cutter assembly; said cutter assembly comprising a rotary cutter type knife mounted for rotation about an axis transverse to the direction of film movement, a support table for receiving said film from said advancing mechanism, said knife having an axially extending cutting edge, said cutting edge being movable from a normal position wherein it is above said support table to a cutting position wherein it is below the top of said support table, and means to position said cutting edge sufficiently close to an edge of said support table so as to sever film resting on said support table and extending past the cutting edge of said knife when the knife is moved to its cutting position.

4. The combination as specified in claim 3 wherein said means to actuate said knife includes a link having a notch therein, a lever having an edge portion engaging said notch, said lever being pivotally mounted to the housing, and actuator means for moving said lever about its pivot to in turn move said link when said lever is engaging said notch, and means on said lever to move said link into clearing engagement with said lever after the lever has pivoted a predetermined number of degrees, thereby to release said link, and means to return said cutter to its normal position.

5. A film cutter comprising a housing, means on said housing for advancing a strip of film one frame at a time, a cutter assembly, means to mount said cutter assembly so that said film moves through said cutter assembly as the film advances; control means to actuate said cutter assembly to sever the film in response to a predetermined number of frames being advanced through the cutter assembly, said means to actuate said cutter assembly including a drive link, power means to actuate said drive link, and releasable connection means between said drive link and said power means operable to release said drive link after the cutter assembly has moved to its cutting position and before the power means has moved to a fully actuated position.

6. The combination as specified in claim 5 and means to return said cutter to a non-cutting position after said releasable connection means has released said drive link.

7. A film cutter comprising a housing, means on said housing for advancing a strip of film one frame at a time, comprising apertures along one edge of said film indexed with respect to the individual exposures on said film, pawl means positioned below said film and drive means to actuate said pawl means to move said film forwardly one frame at a time; a cutter assembly; means to mount said cutter assembly so that said film moves through said cutter assembly as the film advances; control means to actuate said cutter assembly to sever the film in response to a predetermined number of frames being advanced through the cutter assembly; said drive means to actuate said pawl means comprising a crank, a crank follower driven by said crank, said crank follower having a portion moving in a reciprocal path, means between said crank follower and said pawl means to drive said pawl means in a reciprocal path, and switch means responsive to the position of said crank follower operative to give a signal to indicate each time the pawl has been advanced to a predetermined position.

8. The combination as specified in claim 7 and means connecting said switch means to said means to actuate said cutter assembly so that the cutter assembly is operated in response to a predetermined number of signals from said switch means.

9. The combination as specified in claim 8 and means to permit adjusting the number of times the signal from said switch means is received before the cutter assembly is actuated.

10. The combination as specified in claim 7 and means to disable the crank whenever the cutter assembly moves from its non-cutting position.

11. The combination as specified in claim 9 wherein said housing comprises two sections, a lower section having thereon operating controls and an upper section having thereon film advancing means and the cutter assembly, and wherein said upper section is fastened to said lower section with symmetrical fastening means to permit reversing the upper section end for end with respect to the lower section, the only connection between the mechanism on the upper section and the lower section being electrical connection means.

12. An automatic film cutter and programming combination comprising a housing, means on the housing for guiding a strip of film along a predetermined path, said film having apertures along one side thereof indexed with respect to images on the film, pawl means on said housing movable in a reciprocal direction parallel to the direction of movement of said film, said pawl means being adapted to engage said apertures to move said film one frame length in one direction each time the pawls cycle and disengage said apertures when the pawls move in the opposite direction, pawl drive means for moving said pawl means including an electrically powered prime mover, a cutter assembly, means to mount said cutter assembly so that said film moves through said cutter assembly as the film is advanced by said pawl means, said cutter assembly including a rotary knife movable from a normal position wherein the film will pass through said cutter assembly to a cutting position wherein said film will be severed along a predetermined path, means for moving said knife from its normal position to its cutting position including electrical power means, first electrical interlock means between said electrical prime mover means for driving said pawl and said electrical power means for said knife, said electrical interlock means including adjustable switch means responsive to the number of times said pawl advances for initiating the power means for said cutter assembly, and second electrical interlock means responsive to the number of times the power means for said cutter knife operates to reset the first and second interlock means to starting positions.

13. The combination as specified in claim 12 wherein said first and second electric interlock means each comprise stepping switch means, one responsive to the number of times the pawl operates and the second responsive to the number of times the knife operates.

14. The combination as specified in claim 12 wherein said interlock means include control switch means that must be closed after the interlocks are both operated before the pawl means will again be started.

15. The combination as specified in claim 12 wherein the portion of said housing supporting the film is a translucent wall, and light means beneath said translucent wall of sufficient intensity so that images on said film can be viewed by a human eye.

References Cited

UNITED STATES PATENTS

| | | | |
|---|---|---|---|
| 2,249,575 | 7/1941 | O'Brien et al. | 83—221 |
| 2,507,395 | 5/1950 | Boegner | 226—135 X |
| 2,554,827 | 5/1951 | Helsel | 226—135 X |
| 2,695,668 | 11/1954 | Roth | 83—242 X |
| 3,074,607 | 1/1963 | Casey et al. | 83—242 X |
| 3,174,374 | 3/1965 | Wick et al. | 83—221 X |
| 3,310,211 | 3/1967 | Surber et al. | 83—243 X |
| 3,320,842 | 5/1967 | Bailey et al. | 83—221 X |

WILLIAM S. LAWSON, Primary Examiner

U.S. Cl. X.R.

83—250, 611; 226—135